Patented July 4, 1933

1,916,742

UNITED STATES PATENT OFFICE

WALTER SCHOELLER, OF BERLIN-WESTEND, AND ERICH BORGWARDT, OF BERLIN-PANKOW, GERMANY, ASSIGNORS TO SCHERING-KAHLBAUM A.-G., OF BERLIN, GERMANY

MANUFACTURE OF MONOBROMINATED MENTHANE

No Drawing. Application filed December 27, 1929, Serial No. 416,998, and in Germany December 31, 1928.

Our invention refers to the manufacture of monobrominated menthane. By treating menthane with bromine either no brominated menthane is obtained or if bromination at all takes plate di- and polybrominated menthanes are obtained.

We have found that by treating menthane with bromine in the presence of small quantities of iodine as catalyst monobrominated menthane can be obtained in good yield.

Example

To 21 g. menthane are added a few grains of iodine and at a temperature of 0° C. 24 g. bromine are cautiously poured in. The reaction occurs with the development of hydrobromic acid. If hydrobromic acid does not further escape, the mixture is washed with water and a solution of soda. There remains an almost colourless oil which can be fractionated in vacuo. The main-bulk distills over between 90 and 130° C. at 15 mm. pressure of mercury. If the fractionation in vacuo is repeated the monobrominated menthane distills at 115°–120° C. and 15 mm. pressure of mercury. It contains 38% bromine. ($C_{10}H_{19}Br$ contains 36.6% bromine.)

Various changes may be made in the details disclosed in the foregoing specification without departing from the invention or sacrificing the advantages thereof.

We claim:—

1. Process for the production of a monobrominated menthane comprising reacting upon paramenthane with a substantially equal molecular quantity of bromine in the presence of iodine.

2. Process for the production of a monobrominated menthane comprising reacting upon paramenthane with a substantially equal molecular quantity of bromine in the presence of iodine at a temperature of about 0° C.

WALTER SCHOELLER.
ERICH BORGWARDT.